United States Patent

[11] 3,600,992

| | | | | |
|---|---|---|---|---|
| [72] | Inventor | Jacques Max Dryon<br>Auvelais, Belgium | | |
| [21] | Appl. No. | 869,510 | | |
| [22] | Filed | Oct. 27, 1969 | | |
| [45] | Patented | Aug. 24, 1971 | | |
| [73] | Assignee | Ateliers Heuze, Malevez & Simon Reunis<br>Societe Anonyme<br>Auvelais, Belgium | | |
| [32] | Priority | Dec. 9, 1968 | | |
| [33] | | Belgium | | |
| [31] | | 67.231/68 | | |

[54] DEVICE FOR THE SCORING OF A GLASS SHEET
6 Claims, 4 Drawing Figs.

[52] U.S. Cl. .................................................. 83/12,
83/8, 83/212, 83/222, 83/251, 83/421, 83/424, 225/96
[51] Int. Cl. ....................................................... B26d 3/08
[50] Field of Search .......................................... 83/6, 11,
12, 8, 418, 7, 419, 421, 251, 253, 250, 212, 222;
225/2, 96, 96.5

[56] References Cited
UNITED STATES PATENTS

| | | | |
|---|---|---|---|
| 1,259,359 | 3/1918 | Carr .............................. | 83/251 |
| 3,165,017 | 1/1965 | Galabert ....................... | 83/7 |
| 3,216,635 | 11/1965 | Lefevre ........................ | 83/12 X |

*Primary Examiner*—Frank T. Yost
*Attorney*—Waters, Roditi, Schwartz & Nissen

ABSTRACT: An apparatus for scoring a sheet of glass wherein the tool carriage moves along a fixed gantry located over the glass. The glass is moved into scoring position using initially a primary and then a secondary power means for the work moving conveyor.

DEVICE FOR THE SCORING OF A GLASS SHEET

The invention has as object a device for scoring a sheet of glass to be cut up into volumes of a desired format.

The known devices of this type may comprise a fixed gantry arranged transversely between an upstream conveyor and a downstream conveyor having endless belts which are driven by at least one drum operated by a driving device. A carriage, which can move from one end of the fixed gantry to the other, is provided with a tool carrier which is adapted to lower the tool on to the sheet of glass with a view to scoring the latter during the travel of the carriage on the gantry, and to raise the tool again when the latter has arrived at the end of its travel, and a retractable stop is capable of registering the front edge of the sheet of glass when the said edge has arrived at the scoring line, and of stopping the advance of the conveyor with a view to immobilizing the sheet of glass during the scoring operation.

In accordance with the invention, the device also comprises a means for unlocking the driving device for the conveyors and the drum or drums driving the belts, at the moment when the front edge of the sheet of glass arrives at the scoring line, and a means for positioning the sheet of glass, the said means acting upon the belts and causing them to advance, together with the sheet of glass which they are carrying, by a predetermined length in such a way that the sheet of glass is positioned, in relation to the tool, precisely at the place at which the subsequent scoring is to be effected.

The means for unlocking the driving device for the conveyors and the drum or drums driving the belts, comprises a clutch which is itself controlled by the retractable stop, for the purpose of disengaging the clutch when this stop is retracted after making contact with the front edge of the sheet of glass. The belts are then disengaged from the conveyor drive and are coupled to the latter again only after the rear edge of the sheet of glass has passed the scoring line and the stop has returned, ready for the arrival of the next sheet of glass. The downstream conveyor is advantageously connected mechanically, for example by sprockets and a chain, to the upstream conveyor in such a way that the belts of the two conveyors have the same speed of advance.

The means for positioning the sheet of glass according to the invention consists of gripping members capable of bearing against the lower face of the lower courses of the belts. These members are mounted on a transverse girder which can move parallel to itself in the direction of advance of the belts and is controlled by a device which is capable of displacing it by a distance corresponding to the length previously determined for the advance of the sheet of glass, either from its front edge located on the scoring line, or from the last scoring effected. The gripping members are advantageously pneumatic cups, while the device adapted for displacing the mobile girder is preferably constituted by a set of jacks comprising a series of axially aligned jacks, in which series the piston rod of one jack is rigidly integral with the cylinder end of the following jack. The jacks are all operated at full stroke, but the length of the stroke of one jack is normally different from that of the other jacks. By choosing a specific combination of jacks, to be actuated simultaneously, the effective travel of the set of jacks corresponds exactly to the desired displacement of the belts and thus to the length of advance sought for the sheet of glass.

Compared with similar known devices for scoring sheets of glass, the device according to the invention has various advantages:

it is technically very simple, which appreciably reduces the cost of construction;

it permits rapid scoring of sheets of glass, in spite of the presence of a single scoring tool, and can easily be incorporated in a line for processing glass drawn from an average production capacity; it is even possible to contemplate its use in lines for which a device provided with a number of scoring tools operating simultaneously would normally be chosen;

it works with remarkable precision which may easily be taken to a high level, for example to a fraction of a millimeter;

it lends itself to manual control as well as to automatic control in accordance with one or more cutting programs fed into a computer, either with or without making allowance for the flaws which may be contained in sheets of glass and which are often registered and marked in advance, or the coordinates of which are fed into the computer.

The accompanying drawings show, by way of examples, a number of combined forms of embodiment of the invention.

Figure 1:
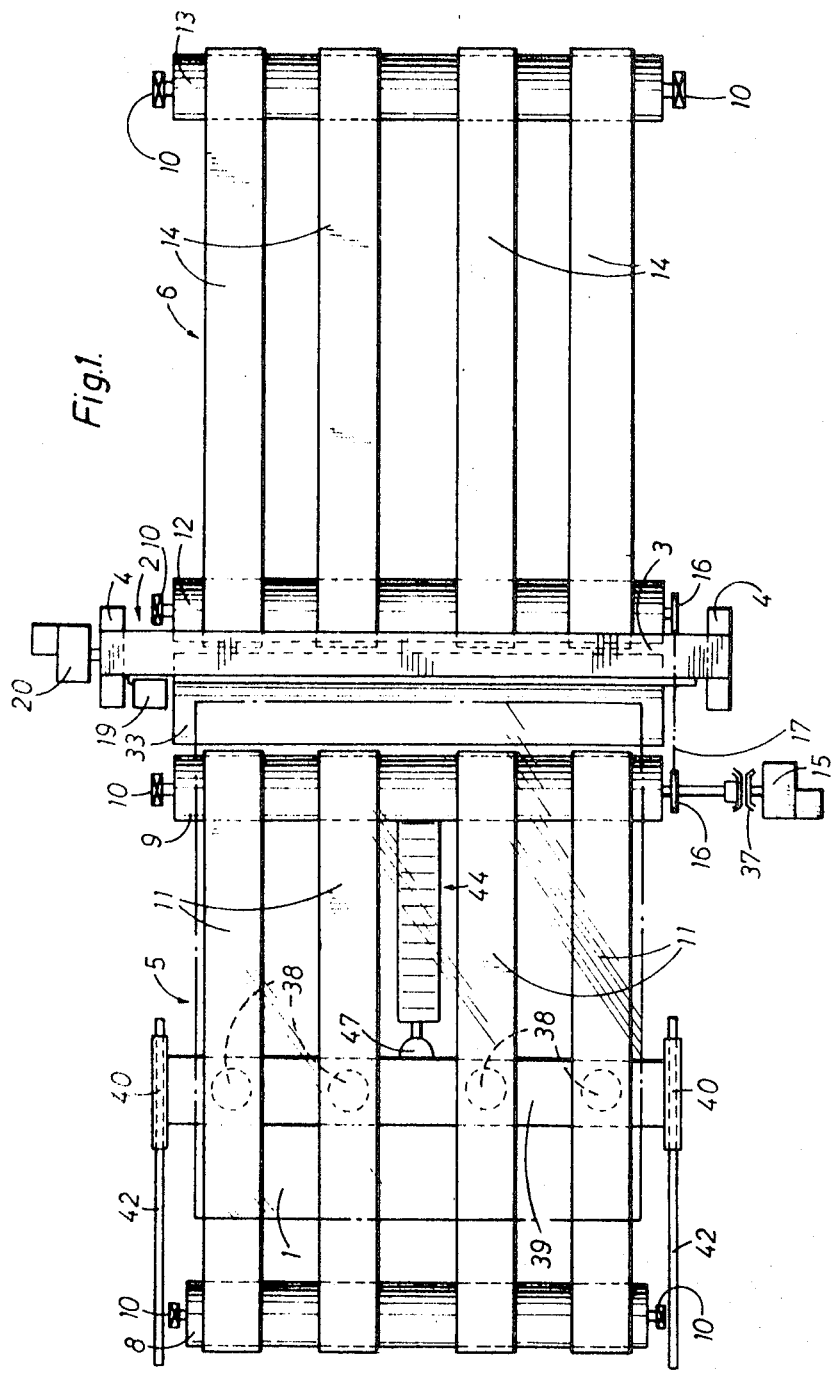
FIG. 1 is a diagrammatic plan view of the device according to the invention.

The device for scoring the sheets of glass 1 has a fixed gantry 2, which is constituted by a horizontal girder 3 fixed rigidly on uprights 4 (FIG. 1) and is disposed transversely between an upstream conveyor 5 and a downstream conveyor 6. The upstream conveyor 5, which is preceded by a roller conveyor 7, (FIG. 2), consists of a pair of drums 8 and 9, which are mounted in bearings 10 (FIG. 1), and endless belts 11 which pass around the said drums. Similarly, the downstream conveyor 6 comprises a pair of drums 12 and 13 and endless belts 14. It is followed by a conveyor which is not illustrated in the drawings but which leads to the station at which the scored sheets of glass are broken up. The drum 9 is driven in rotation by a motor reduction gearing unit 15 (FIG. 1) and, on the shaft ends of the drums 9 and 12, sprockets 16 are locked which have the same number of teeth and carry a chain 17 intended to drive the downstream conveyor 6 at the speed imposed upon the upstream conveyor 5.

Figure 3:
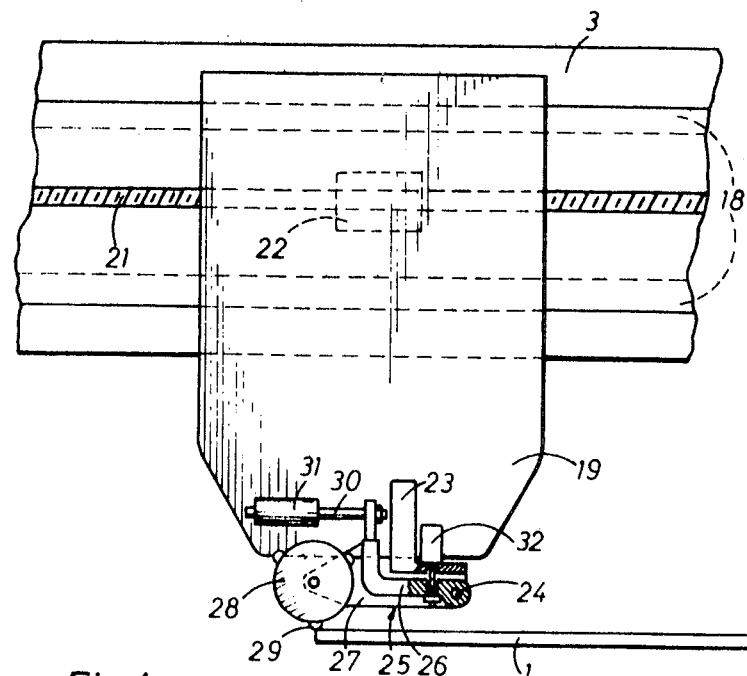
FIG. 3 illustrates on a larger scale, a view of the carriage with the tool-carrier and of the scoring tool.

The horizontal girder 3 of the fixed gantry 2 is provided with slide-guides 18 upon which a carriage 19 is adapted to be displaced from one end of the beam to the other. The travel of the carriage is controlled by a motor reduction gearing unit 20 (FIG. 1) which rotationally drives, in one direction or the other, a screw 21 passing through a nut 22 which is integral with the carriage, as is better shown in FIG. 3. On the carriage 19 is fixed a cranked support 23 on which is articulated at 24 a tool carrier 25 constituted by a cranked lever 26 on which is welded a vertical plate 27 carrying at its end a roller 28 provided with a number of scoring tools 29, one of which is in the operational position. On the cranked lever 26 is mounted a rod 30 which carries a counterweight 31 intended to regulate the pressure of the scoring tool 29 against the surface of the glass. The carriage 19 also comprises an electromagnet 32 which is capable of lowering the tool carrier 25 for the purpose of placing a tool 29 on the edge of the sheet of glass prior to a scoring pass of the carriage, of raising the tool carrier after this pass and of maintaining it in the raised position during the return pass of the carriage. During the scoring operation, the sheet of glass is supported by a roller 33 adapted to be driven in rotation at a peripheral speed corresponding to the speed of advance of the belts 11 and 14, about an axis which is disposed vertically beneath the scoring line.

Immediately after the scoring line, the device has a retractable transverse stop 34 (FIG. 2), against which the front edge of a sheet of glass 1 driven by the upstream conveyor 5 may strike. This stop may be retracted to allow the passage of the sheet of glass by means of one or more electromagnets 35 mounted on the girder 3 of the fixed gantry 2 and connected to the stop by cranked arms 36.

In accordance with the invention, the device also comprises a means for isolating the motor reduction gearing unit 15 from the shaft end of the drum 9, and also means for positioning the sheet of glass when the said motor reduction gearing unit is isolated and is no longer capable of effecting the advance of the belts 11 and 14.

The means for isolating the motor reduction gearing unit is a clutch 37 (FIG. 1) interposed between the latter and the shaft end of the drum 9. It is preferably electromagnetic and has a relay, the energization of deenergization of which is controlled by the retractable stop 34 at the moment at which the front edge of the sheet of glass comes into contact with the stop. For this purpose, the latter is provided with one or more contractors (not illustrated) which are capable of being actuated by the front edge of the sheet of glass. In order to reduce the effect of the impact between the sheet of glass and the retractable stop, a mechanical or other type of contractor (not illustrated) is advantageously provided, which is capable of being actuated by the front edge of the sheet of glass when the said edge is approaching the retractable stop, and of reducing the speed of rotation of the motor reduction gearing unit 15 slightly before it is isolated.

Figure 2:
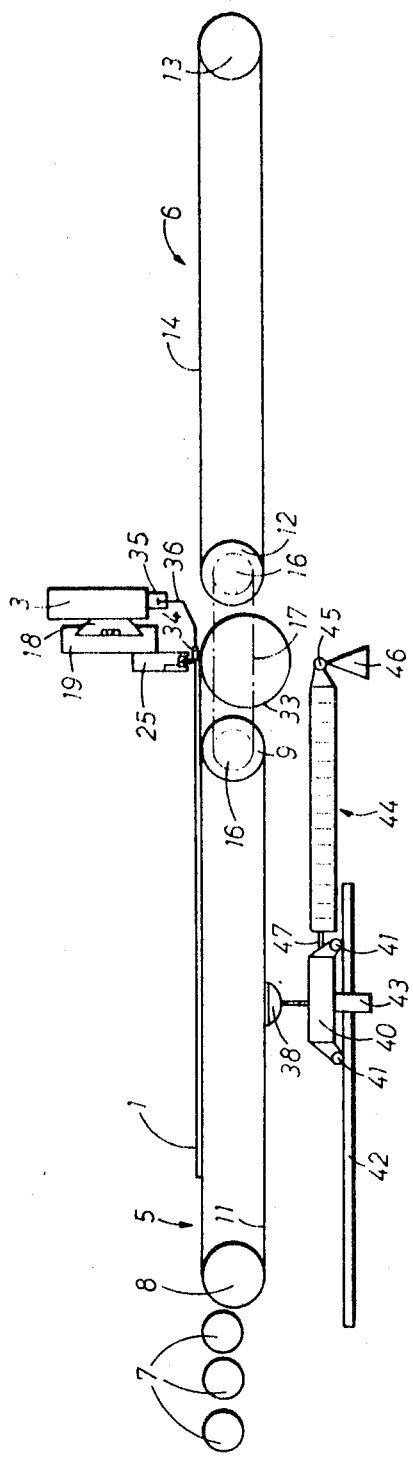
FIG. 2 shows, in very diagrammatic form, a side view of this device.

The means for positioning the sheet of glass when the motor reduction gearing unit has been isolated and stopped comprise, on the one hand, a gripping member acting on the lower face of the bottom course of the belts 11, in this case pneumatic cups 38 mounted on a transverse girder 39 (FIG. 1) which is mobile and capable of being displaced on carriages 40 whose rollers 41 roll on rails 42 parallel to the belts 11. For each cup, the girder 39 also carries a vacuum jack 43 (FIG. 2). On the other hand, the positioning means comprise a member for adjusting the displacement of the girder 39 and consequently that of the belts 11, together with the sheet of glass placed thereon. This member is advantageously constituted by a set of jacks 44 whose articulation 45 (FIG. 2) is mounted on a reference column 46 and whose other end is coupled to the mobile girder at the point 47.

Figure 4:
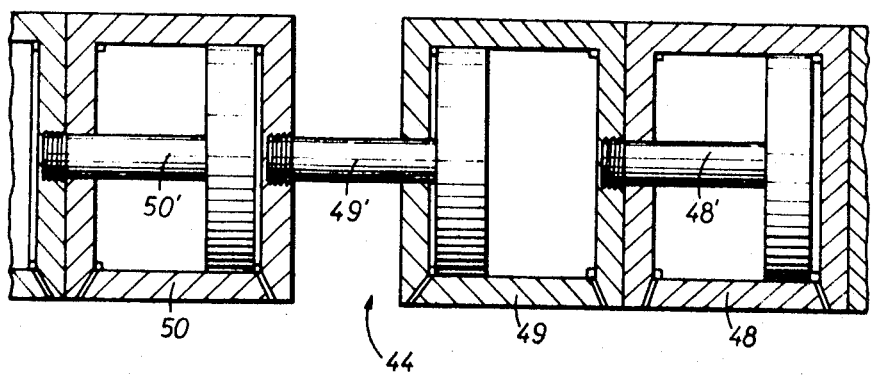
FIG. 4 shows part of the set of axially juxtaposed jacks.

This set of jacks 44 comprises a series of axially juxtaposed jacks 48, 49, 50 etc. (FIG. 4) of which the piston rods 48′, 49′, 50′ etc. are rigidly integral with the cylinder end of the next jack, whose piston rod 48′ is integral with the cylinder end of the jack 49. All the jacks are actuated with full travel by a suitable, liquid or gaseous fluid, as shown by way of example in respect of the jack 49. The travel of the jacks is selected in such a way that, by a desired combination of jacks to be actuated, it is possible to impart to the set of jacks a total travel which exactly corresponds to the displacement of the sheet of glass necessary to position it for the next scoring operation. The set of jacks thus comprises jacks having a travel of, for example, 0.5 mm., 1, 2, 2 and 5 mm, 10, 20, 20, 50 mm, 100, 200, 200, 500 and 1000 mm, if it is desired to cut off sheets of glass in portions having a predetermined with not exceeding 2 meters, and with an accuracy as great as half a millimeter. Sets of jacks of this kind have already been described, but not their combination with the other members forming part of the device according to the invention.

In order to carry out scoring of a sheet of glass which, at the preceding stations in the processing line, have been cut from the strip of glass which has been drawn and trimmed at the longitudinal edges, this sheet is conducted, by the conveyor 5 having rollers 7, on to the belts 11 to which an advance movement has been imparted by the motor-reduction gearing unit 15, actuating, via the clutch 37, the driving drum 9 of the conveyor 5. At the scoring line, the retractable stop 34 is now at the level of the sheet of glass. Shortly before it reaches the scoring line, the front edge of the sheet of glass actuates a contactor (not illustrated), which is capable of reducing the speed of rotation of the motor reduction gearing unit 15, and, at the moment when this front edge makes contact with the retractable stop, it acts upon the contactor or contactors which are provided in the stop and are intended, on the one hand, to interrupt the supply to the motor reduction gearing unit and disengage the clutch 37 and, on the other hand, to actuate the electromagnets 35 (FIG. 2) in order to control the retraction of the stop 34.

The actuation of the electromagnets 35 may, in addition, have the effect of closing the circuits necessary for controlling the members for positioning the sheet of glass. When these circuits are open, i.e. while the conveyors 5 and 6 are being driven by the motor reduction gearing unit 15, the set of jacks 44 is retracted to its shortest length, at which all the jacks touch each other, and the pneumatic cups 38 are lowered. As soon as the clutch is disengaged and the stop retracted, the cups are actuated in order to bear against the belts 11 and to be made integral with the latter by the vacuum jacks 43, which makes it possible to act upon the desired combination of jacks in the set of jacks 44, for the purpose of displacing the mobile girder 40 on its rails 42 and, with it, the belts 11 and the sheet of glass which is placed on the latter and is thus displaced by the distance necessary for effecting scoring. On the scoring line, the sheet of glass is supported by the roller 33. Afterwards, it is picked up again by the conveyor 6 whose belts 14 are driven when the belts 11 are driven in one manner or the other. An end of travel contact (not illustrated) is actuated by the mobile girder. The consequence of actuation of this contact is that the cups are no longer subjected to vacuum and detach themselves from the belts, and that the set of jacks retracts itself.

Another consequence of actuation of this end of travel contact consists in the starting up of the scoring train, comprising the energizing (or deenergizing) of the electromagnet 32 (FIG. 3), enabling the tool carrier 27 to lower a tool 29 at the edge of the sheet of glass, the starting up of the motor reduction gearing unit 20 (FIG. 1) in order to turn the screw 21 (FIG. 3) effecting the translation movement of the carriage 19 from one end of the girder 3 to the other during the scoring operation, and the deenergizing (or energizing) of the electromagnet 32 in order to maintain the tool carrier in the raised condition during the return travel of the carriage to its starting point, controlled by the screw 21 after its direction of rotation has been reversed.

This sequence of operations is repeated for successive scorings of the sheet of glass. When the rear edge of the latter passes the scoring line, it releases a contractor (not illustrated) which has been lowered by the sheet on its arrival on the conveyor 5. This contactor is capable of lowering the retractable stop to the level of the next sheet of glass, and of restoring voltage to the motor reduction gearing unit 15, and also of engaging the latter with the shaft end of the drum 9 for the purpose of bringing this fresh sheet of glass in front of the retractable stop.

Naturally the invention is not limited to the forms of embodiment which have been described and illustrated by way of examples, and the application of modifications to the invention would not constitute a departure from its scope.

I claim:

1. Device for scoring a sheet of glass to be cut up into volumes of a desired format, comprising a fixed gantry disposed transversely between an upstream conveyor and a downstream conveyor having endless belts which are driven by at least one drum operated by a driving device, a carriage which can move from one end to the other of the fixed gantry and is provided with a tool carrier adapted to lower the tool on to the sheet of glass with a view to scoring the latter during the translation movement of the carriage on the gantry and to raise the tool again when the latter has arrived at the end of its travel, a retractable stop capable of registering the front edge of the sheet of glass when the said edge has arrived at the scoring line, and of stopping the advance of the conveyors with a view to immobilizing the sheet of glass during the scoring operation, characterized in that it also comprises a means for unlocking the driving device for the conveyors and the drum or drums driving the belts, at the moment when the front edge of the sheet of glass arrives at the scoring line, and a means for positioning the sheet of glass, the said means acting upon the belts and causing them to advance, together with the sheet of glass which they are carrying, by a predetermined length in such a way that the sheet of glass is positioned, in relation to the tool, precisely at the place at which the subsequent scoring is to be effected.

2. Device according to claim 1, characterized in that the means for unlocking the driving device for the conveyors and the drum or drums driving the belts, comprises a clutch which is itself controlled by the retractable stop for the purpose of disengaging the clutch when this stop is retracted after making contact with the front edge of the sheet of glass, in such a way that the belts are then disengaged from the conveyor drive and are coupled to the latter again when the rear edge of the sheet of glass has passed the scoring line.

3. Device according to claim 1, characterized in that the downstream conveyor is connected mechanically to the upstream conveyor in such a way that the belts of the two conveyors have the same speed of advance.

4. Device according to claim 1, characterized in that the means for positioning the sheet of glass comprises gripping members which are capable of bearing against the lower face of the bottom courses of the belts and are mounted on a transverse girder which can move parallel to itself in the direction of advance of the belts and is controlled by a device which is capable of displacing it by a distance corresponding to the length previously determined for the advance of the sheet of glass, either from its front edge which is located on the scoring line, or from the last scoring effected.

5. Device according to claim 4, characterized in that the gripping members are pneumatic cups.

6. Device according to claim 4, characterized in that the member capable of displacing the mobile girder is constituted by a set of jacks comprising a series of axially aligned jacks, in which series the piston rod of one jack is rigidly integral with the cylinder end of the following jack, these jacks being operated at full stroke and the stroke of one jack being normally different from that of the other jacks in such a way that, by choosing a specific combination of jacks to be actuated simultaneously, the effective travel of the set of jacks corresponds exactly to the desired displacement of the belts and thus to the length of advance sought for the sheet of glass.